(12) United States Patent
Weinfurt

(10) Patent No.: US 12,225,048 B2
(45) Date of Patent: Feb. 11, 2025

(54) PACKET CAPTURE USING FIXED ENCRYPTION KEY

(71) Applicant: Microsoft Technology Licensing, LLC, Redmond, WA (US)

(72) Inventor: Tomas Weinfurt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 17/713,520

(22) Filed: Apr. 5, 2022

(65) Prior Publication Data
US 2023/0319109 A1    Oct. 5, 2023

(51) Int. Cl.
*H04L 9/40* (2022.01)

(52) U.S. Cl.
CPC .................. *H04L 63/166* (2013.01)

(58) Field of Classification Search
CPC ...................................... H04L 63/166
See application file for complete search history.

(56) References Cited

U.S. PATENT DOCUMENTS

| | | | |
|---|---|---|---|
| 11,924,299 B2 * | 3/2024 | Mestery | H04L 67/1012 |
| 2020/0236140 A1 * | 7/2020 | Srinivasan | H04L 5/0055 |

OTHER PUBLICATIONS

"3rd Generation Partnership Project; Technical Specification Group Core Network and Terminals; Study on IETF QUIC Transport for 5GC Service Based Interfaces; (Release 16)", In Technical Report of 3GPP TR 29.893, V1.3.0, Mar. 2020, 40 Pages.
Marx, et al., "Towards QUIC debuggability", In Proceedings of the Workshop on the Evolution, Performance, and Interoperability of QUIC, Dec. 4, 2018, pp. 1-7.
"International Search Report and Written Opinion Issued in PCT Application No. PCT/US23/011481", Mailed Date: May 11, 2023, 10 Pages.
Weinfurt, Tomas, "PcapStream", Retrieved from: https://github.com/wfurt/PcapStream, Sep. 15, 2021, 3 Pages.

* cited by examiner

*Primary Examiner* — Esther B. Henderson
(74) *Attorney, Agent, or Firm* — Schwegman Lundberg & Woessner, P.A.

(57) ABSTRACT

A computer implemented method includes receiving data from an application layer resulting in received data. The received data is diverted to an input/output layer outside a communication stack and data packets are generated from the received data. Mock packet headers are fabricated with packet formatting and address corresponding to an underlying transport layer. Corresponding mock packet headers are concatenated with the data packets to form transport packets which are encrypted using a fixed key. The transport packets are provided to a network debug tool for decryption using a public key for execution of the network debug tool to inspect the transport packets.

20 Claims, 4 Drawing Sheets

PACKET CAPTURE USING FIXED ENCRYPTION KEY

BACKGROUND

Hypertext Transfer Protocol (HTTP) is an application-layer protocol for transmitting hypermedia documents, such as hypertext markup language (HTML) text. HTTP was designed for communication between web browsers and web servers. Recent trend to move from HTTP to hypertext transfer protocol secure (HTTPS) brings better security and privacy but it also presents challenges for developers and network administrators. In HTTPS, the communication protocol is encrypted using Transport Layer Security (TLS) or, formerly, Secure Sockets Layer (SSL). The protocol is therefore also referred to as HTTP over TLS, or HTTP over SSL. Since network traffic over HTTPS is encrypted using a secure communication protocol, it is difficult to use prior network analyzers that analyze HTTPS network traffic patterns, as it is more difficult to decode and inspect the HTTPS network traffic.

Prior protocols, such as HTTP/1.1 are plain text, which facilitates text logging which can be used by network analyzers. Starting with HTTP/2 protocols, the transfer protocol is binary, making it more difficult to both decode packets and then debug network operations.

Another challenge is that typical packet capture may require admin privilege and direct access of the networking device. Getting both admin privileges and direct access may be difficult in cloud computing environments.

One prior solution uses a network packet capture format created at an application level of the network. The network packet capture format can be implemented as small Input/Output (IO) layer that captures network layer 7 (L7 of the Open Systems Interconnect (OSI) model) data written to an underlying transport layer and writes the data in the form of network packets for debugging. The IO layer implementation misses the L2 (data link layer)/L3 (network layer)/L4 (transport layer) information but those layers are not too difficult to synthetize by creating contrived ethernet and (Internet Protocol) IP headers and writing minimal transmission control protocol (TCP) information so the packet looks valid to networking tools. This prior solution does not address newer protocols that introduce further complexity by utilizing additional binary layers.

SUMMARY

A computer implemented method includes receiving data from an application layer resulting in received data. The received data is diverted to an input/output layer outside a communication stack and data packets are generated from the received data. Mock packet headers are fabricated with packet formatting and address corresponding to an underlying transport layer. Corresponding mock packet headers are concatenated with the data packets to form transport packets which are encrypted using a fixed key. The transport packets are provided to a network debug tool for decryption using a public key for execution of the network debug tool to inspect the transport packets.

DETAILED DESCRIPTION

Figure 1:
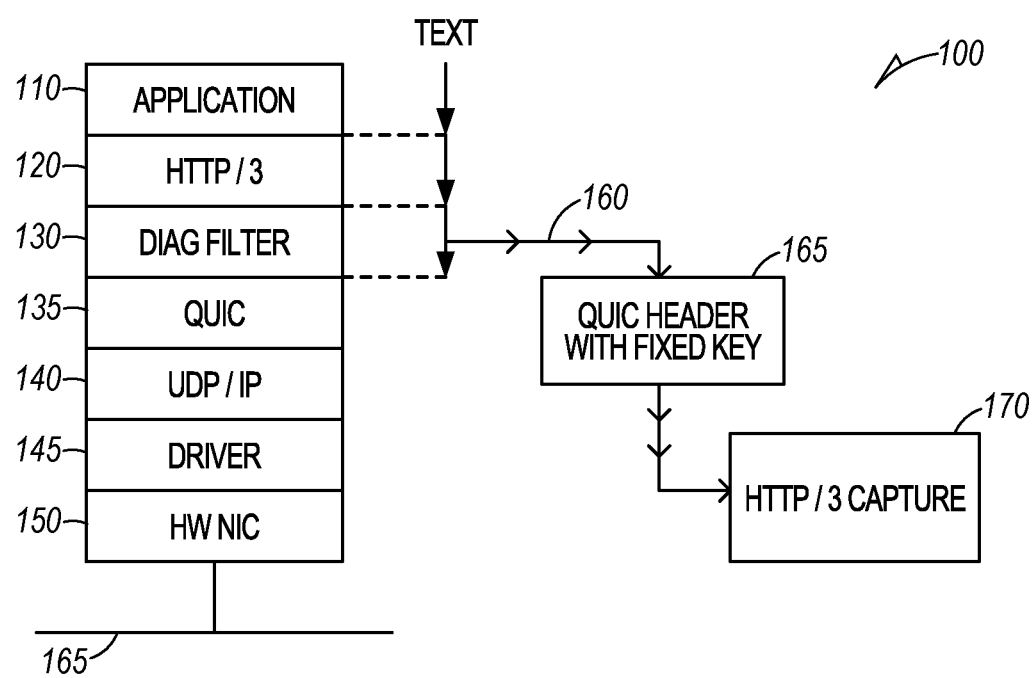
FIG. 1 is a block diagram illustrating a system for capturing network traffic for analysis by network analysis tools according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

An improved method of capturing network packets that are encrypted using packet transfer protocols utilizes an encryption of plain text and the addition of mock headers for packet transfer. The use of a fixed public key to decrypt the packets makes it easier for packets to be captured and decoded, allowing network analyzers to better analyze network traffic.

Prior data transfer protocols, such as hypertext transfer protocol (HTTP)/1.1 are plain text, which facilitates text logging which can be used by network analyzers. Starting with HTTP/2 the transfer protocol is binary, making it more difficult to both decode packets and then debug network operations. With HTTP/3, which uses the QUIC protocol (originally an acronym for Quick UDP (user data protocol) Internet Connections) for transport, there are two somewhat independent binary layers that facilitate allowing multiple streams of data to reach all the endpoints independently, and hence independent of packet losses involving other streams. Use of gRPC (remote procedure calls) brings yet another complicated binary layer by providing features such as authentication, bidirectional streaming and flow control, blocking or nonblocking bindings, and cancellation and timeouts, making it even more difficult to decode packets and understand network traffic.

One way to capture encrypted network traffic for use by network analysis tools is to somehow extract TLS/QUIC session decryption keys and feed them to the network analysis tools for analysis. Feeding session decryption keys to tools creates a security risk. In addition, many products do not offer this in released versions and it is impossible on some operating system versions for security reasons. Feeding of keys in this manner will not help with applications running in cloud platforms where the application may be unable to collect the packets.

Unlike previous versions, there is no plain-text version of QUIC/HTTP/3 so none of the available tools are able to decode the protocols even when written in binary plain text. To overcome this, the layer can write the application data encrypted with a fixed key that may be an imported one-time session key. By using a fixed universal encryption key, the transport encryption can be separated from debug files. The fixed universal encryption key allows the feeding of a single key to network analysis tools. The single key, such as a single round trip time (1-RTT) key grants ability to decrypt and decode and compliant trace files, allowing the capture of HTTP/3 text.

FIG. 1 is a block diagram illustrating a system 100 for capturing network traffic for analysis by network analysis tools. Text from data that is generated by an application layer 110 is convert to a binary form of data using HTTP/3 transport protocol at 120. A diagnostic filter 130 receives the HTTP/3 binary data and divides or forks the data. HTTP/2 and HTTP/3 multiplex within the transport. Each request/response have a StreamID assigned that will be carried in each corresponding block. The StreamID may be used to determine actions to take for a block using either protocol elements or application logic.

A first fork of the data by diagnostic filter 130 is processed by underlying network layers of a communication stack, including a QUIC layer 135, UDP/IP layer 140, Driver 145, and a hardware network interface card (NIC) 150 that is coupled to a network 155 for transferring packets of encrypted data in a normal manner. Such encryption may use multiple different encryption keys and additional binary layers making capturing network packets in such underlying layers very difficult.

A second fork 160 of the data is processed at an input/output layer 165 to fabricate mock packet headers with packet formatting and address corresponding to an underlying transport layer in the communication stack. The mock packet headers may be QUIC headers. The headers are packet headers that are concatenated with packets and encrypted using a fixed encryption key. The input/output layer 165 captures application layer 110 data written to an underlying transport layer and writes the data the form of network packets for debugging. At block 170, the encrypted packet traffic may be captured and decrypted using a public key may be performed to obtain the HTTP/3 binary data.

System 100 will work even in cloud environments without administrative privilege. By diverting data at the application level it is also possible to be more granular and decrease overall impact on the system 100. By placing the diagnostic filter 130 after the HTTP/3 layer, the diagnostic filter has the ability determine which data is diverted to fork 160. For example packet capture may be performed only for a given URL, transaction, or transaction type. Since the diversion of data may be driven by the application, data that is diverted can be anything specific to the application.

Typical network analyzers do not have a capability to filter on application data, so it is mandatory to capture based on L3/4 traffic and then filter the captured traffic afterwards.

The system 100 provides the ability to effectively debug during development as well as support user customers during use of the system 100. Debugging in various examples can include analyzing the captured data, including protocol details, for issues with header compression and encoding, dynamic header negotiation, HTTP Window updates, trailing headers, stream management, ping frames, closing race conditions, and parameter negotiation among other issues.

Figure 2:
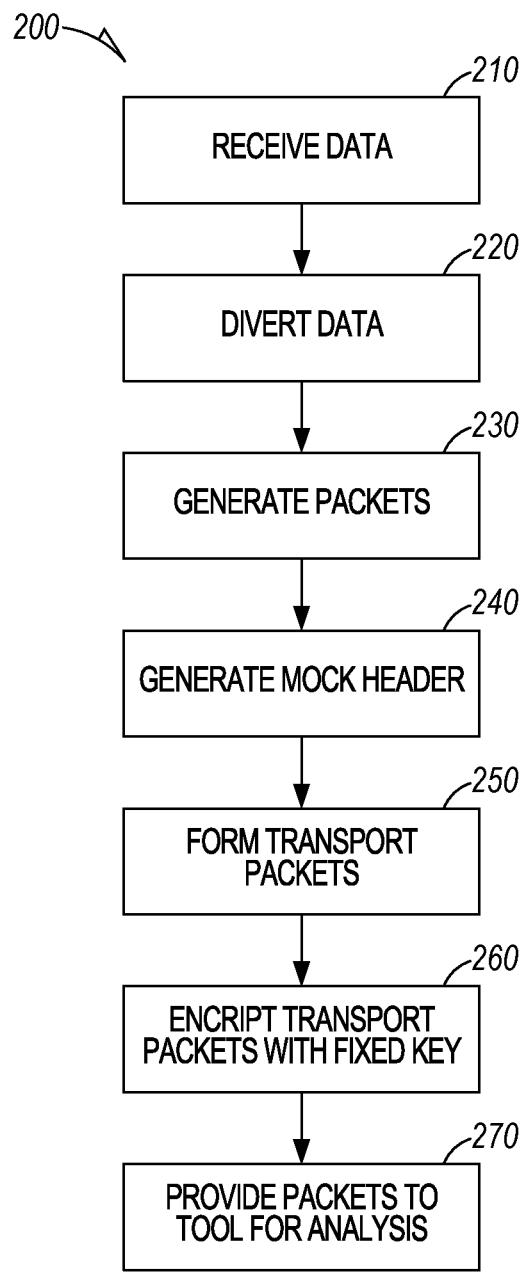
FIG. 2 is a flowchart illustrating a computer implemented method of capturing packets for analysis by networking tools according to an example embodiment.

FIG. 2 is a flowchart illustrating a computer implemented method 200 of capturing packets for analysis by networking tools. Method 200 begins at operation 210 by receiving data at a network application layer. The data may originate from an application that is running on a computer system, either a local system or a cloud hosted system. The data may be converted to a secure transport protocol, such as HTTP/3. The data in the secure transport protocol format is diverted at operation 220 to an input/output layer outside of a communication stack used to process communications over a network.

The communication stack may also receive the data and pass it through multiple network layers utilizing QUIC 135, UDP/IP 140, a driver 145, and a network interface card 150 to send encrypted data packets over a communication network to a destination.

The data that was diverted to the input/output layer outside the communication stack proceeds to generate packets from the received data at operation 230. At operation 240, mock packet headers, such as a QUIC header, are generated with packet formatting and address corresponding to an underlying transport layer. The mock header in one example is a network transport layer header. The mock header may be a valid L2 header that can be either a normal Ethernet header, Loopback or any other well-known type. Loopback encapsulation requires the least number of bytes and is easiest to craft as it does not require endpoint address.

A valid L3 mock header can be either a minimalistic IPv4 header as described in Internet Protocol DARPA internet program protocol RFC 791 or IPv6 header as described in RFC 2460. Typically, IP addresses and ports would be same as real addresses and ports but the rest of the fields (ToS (type of service) or TTL (time to live)) may use default values that can differ from the actually transmitted packets.

A valid L4 mock header will synthetize TCP or UDP packets. For TCO, sequence numbers will be synthesized, and every write will be followed by an artificial ACK. That presents as a valid TCP exchange but may not be suitable for TCP flow analyses or packet loss and retransmit.

A mock QUIC header for HTTP/3 may be generated as described in RFC 9000: The header will use mock sequence and stream IDs. That allows demultiplexing individual requests and responses but may be different from what is transmitted on the wire.

The respective mock packet headers are concatenated at operation 250 with respective data packets to form transport packets.

Operation 260 encrypts the transport packets using a fixed key. The fixed encryption is a transport layer security (TLS) encryption. The key may be a public key, a 1-RTT (round trip time) key, or other types of fixed key in various examples. The transport packets are provided to a network debug tool at operation 270 for decryption using a public key. The network debug tool can inspect the decrypted transport packets. In one example, the transport packets correspond to multiple network sessions, each of which may normally utilize different keys in the communication stack but use the same fixed key in operation 260 in the input output layer that is processing the diverted data.

Figure 3:
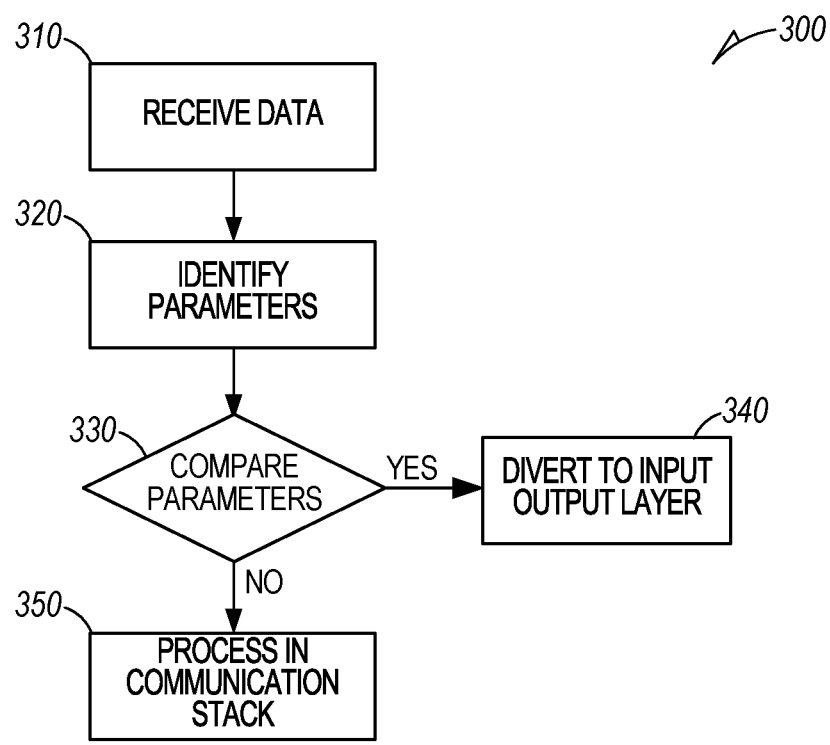
FIG. 3 is a flowchart illustrating a computer implemented method 300 of filtering received data according to an example embodiment.

FIG. 3 is a flowchart illustrating a computer implemented method 300 of filtering received data. In one example, a filter may be used in operation 220 to filter the received data prior to diverting such that less than all the received data is diverted. Method 300 begins by receiving data at operation 310. The data maybe in a format defined by a secure transport protocol language, such as HTTP/3. The received data is examined at operation 320 to identify one or more parameters. The parameters may include address information, session information, transaction type information, or other information. At operation 330, the one or more parameters are compared to one or more filter parameters. If the comparison is positive, (YES), the corresponding data is diverted at 340 to an input output layer for processing via method 200. If the comparison is not positive, (NO), the corresponding data is not diverted, and may continue to be processed via the communication stack for processing at operation 350. Filtering may be performed to divert only received data addressed to a selected uniform resource locator (URL), or other type of address, URLs, transactions, or even types of transaction, in various examples. Further filtering may be used in further examples.

Figure 4:
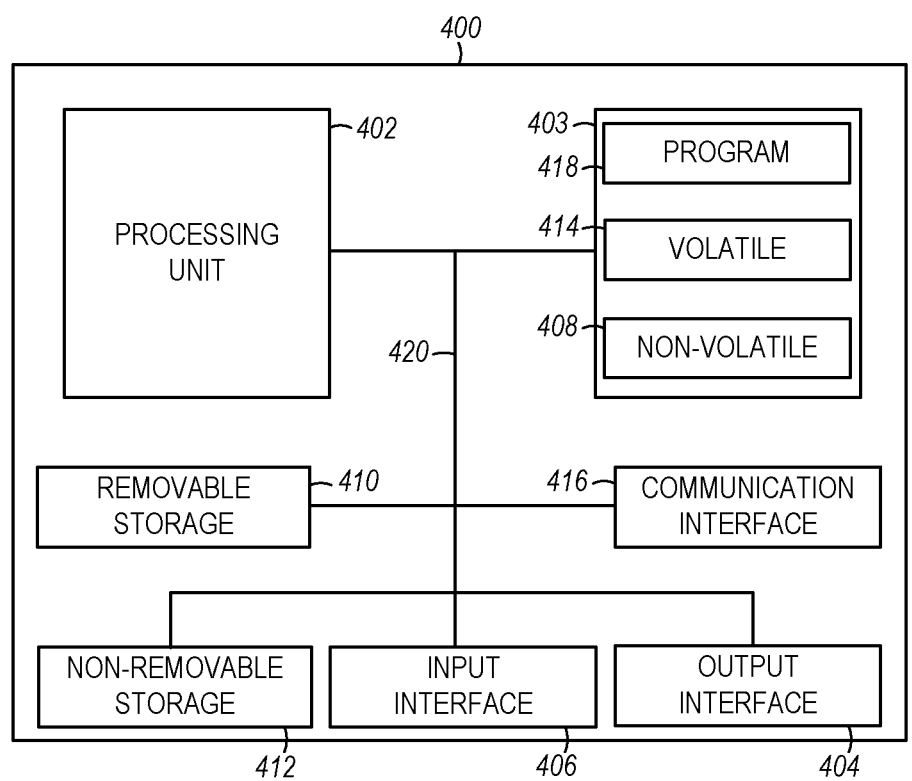
FIG. 4 is a block schematic diagram of a computer system to implement one or more example embodiments.

FIG. 4 is a block schematic diagram of a computer system 400 to perform diversion of network traffic and creation of encrypted packets as well as for performing other methods and algorithms according to example embodiments. All components need not be used in various embodiments.

One example computing device in the form of a computer 400 may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, smart storage device (SSD), or other computing device including the same or similar elements as illustrated and described with regard to FIG. 4. Devices, such as smartphones, tablets, and smartwatches, are generally collectively referred to as mobile devices or user equipment.

Although the various data storage elements are illustrated as part of the computer 400, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input interface 406, output interface 404, and a communication interface 416. Output interface 404 may include a display device, such as a touchscreen, that also may serve as an input device. The input interface 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 418 along with the workspace manager 422 may be used to cause processing unit 402 to perform one or more methods or algorithms described herein.

EXAMPLES

1. A computer implemented method includes receiving data from an application layer resulting in received data. The received data is diverted to an input/output layer outside a communication stack and data packets are generated from the received data. Mock packet headers are fabricated with packet formatting and address corresponding to an underlying transport layer. Corresponding mock packet headers are concatenated with the data packets to form transport packets which are encrypted using a fixed key. The transport packets are provided to a network debug tool for decryption using a public key for execution of the network debug tool to inspect the transport packets.

2. The method of example 1 wherein the transport packets correspond to multiple network sessions.

3. The method of example 1 and further comprising filtering the received data prior to diverting the received data such that less than all the received data is diverted.

4. The method of example 3 wherein filtering is performed to divert only received data addressed to a selected uniform resource locator (URL) or transaction.

5. The method of any of examples 1-4 wherein a mock packet header of the mock packet headers comprises a QUIC header.

6. The method of any of examples 1-4 wherein the fixed key comprises a 1-RTT (round trip time) key.

7. The method of any of examples 1-4 wherein the fixed key comprises a public key.

8. The method of any of examples 1-4 wherein the mock header is a network transport layer header.

9. The method of example 8 wherein the encryption using a fixed key comprises a transport layer security (TLS) encryption.

10. A machine-readable storage device has instructions for execution by a processor of a machine to cause the processor to perform operations to perform any of the methods of examples 1-9.

11. A device includes a processor and a memory device coupled to the processor and having a program stored thereon for execution by the processor to perform operations to perform any of the methods of examples 1-9.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving data from an application layer resulting in received data;
diverting the received data via a diagnostic filter that follows a transport protocol layer of a communication stack to an input/output layer outside the communication stack;
generating data packets from the received data;
fabricating mock packet headers with packet formatting and address corresponding to an underlying transport layer;
concatenating corresponding mock packet headers with the data packets to form transport packets;
encrypting the transport packets using a fixed key; and
providing the transport packets to a network debug tool for decryption using a public key for execution of the network debug tool to inspect the transport packets.

2. The method of claim 1, wherein the transport packets correspond to multiple network sessions.

3. The method of claim 1, further comprising: filtering the received data prior to diverting the received data such that less than all the received data is diverted.

4. The method of claim 3, wherein filtering is performed to divert only received data addressed to a selected uniform resource locator (URL) or transaction.

5. The method of claim 1, wherein a mock packet header of the mock packet headers comprises a QUIC header.

6. The method of claim 1, wherein the fixed key comprises a 1-RTT (round trip time) key.

7. The method of claim 1, wherein the fixed key comprises a public key.

8. The method of claim 1, wherein the mock header is a network transport layer header.

9. The method of claim 8, wherein the encryption using a fixed key comprises a transport layer security (TLS) encryption.

10. A machine-readable storage device having instructions for execution by a processor of a machine to cause the processor to perform operations to perform a method, the operations comprising:
receiving data from an application layer resulting in received data;
diverting the received data via a diagnostic filter that follows a transport protocol layer of a communication stack to an input/output layer outside the communication stack;
generating data packets from the received data;
fabricating mock packet headers with packet formatting and address corresponding to an underlying transport layer;
concatenating corresponding mock packet headers with the data packets to form transport packets;
encrypting the transport packets using a fixed key; and
providing the transport packets to a network debug tool for decryption using a public key for execution of the network debug tool to inspect the transport packets.

11. The device of claim 10, wherein the transport packets correspond to multiple network sessions.

12. The device of claim 10, and further comprising filtering the received data prior to diverting the received data such that less than all the received data is diverted, wherein filtering is performed to divert only received data addressed to a selected uniform resource locator (URL) or transaction.

13. The device of claim 10, wherein a mock packet header of the mock packet headers comprises a QUIC header.

14. The device of claim 10, wherein the fixed key comprises a 1-RTT (round trip time) key.

15. The device of claim 10, wherein the fixed key comprises a public key.

16. The device of claim 10, wherein the mock header is a network transport layer header.

17. The device of claim 16, wherein the encryption using a fixed key comprises a transport layer security (TLS) encryption.

18. A device comprising:
a processor; and
a memory device coupled to the processor and having a program stored thereon for execution by the processor to perform operations comprising:
receiving data from an application layer resulting in received data;

diverting the received data via a diagnostic filter that follows a transport protocol layer of a communication stack to an input/output layer outside the communication stack;
generating data packets from the received data;
fabricating mock packet headers with packet formatting and address corresponding to an underlying transport layer;
concatenating corresponding mock packet headers with the data packets to form transport packets;
encrypting the transport packets using a fixed key; and
providing the transport packets to a network debug tool for decryption using a public key for execution of the network debug tool to inspect the transport packets.

19. The device of claim 18, wherein the transport packets correspond to multiple network sessions.

20. The device of claim 19, further comprising: filtering the received data prior to diverting the received data such that less than all the received data is diverted, wherein filtering is performed to divert only received data addressed to a selected uniform resource locator (URL) or transaction.

\* \* \* \* \*